US010877949B2

(12) United States Patent
Zhu et al.

(10) Patent No.: US 10,877,949 B2
(45) Date of Patent: Dec. 29, 2020

(54) TRANSACTION MONITORING THROUGH A DUAL-LAYER DATASTORE BASED ON A HASH FILTER

(71) Applicant: INTERNATIONAL BUSINESS MACHINES CORPORATION, Armonk, NY (US)

(72) Inventors: Bo Chen Z Zhu, Xian (CN); RenFu Ma, Beijing (CN); Jing Yan Ma, Beijing (CN); Cheng Fang Wang, Beijing (CN); Yu Ying Wang, Beijing (CN); Fu Li Bian, Beijing (CN); Peng Fei Tian, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 188 days.

(21) Appl. No.: 16/122,302

(22) Filed: Sep. 5, 2018

(65) Prior Publication Data

US 2020/0073699 A1    Mar. 5, 2020

(51) Int. Cl.
*G06F 16/22* (2019.01)
*G06F 16/23* (2019.01)

(52) U.S. Cl.
CPC ...... *G06F 16/2255* (2019.01); *G06F 16/2379* (2019.01)

(58) Field of Classification Search
CPC ... G06F 9/466; G06F 16/2379; G06F 16/2255
See application file for complete search history.

(56) References Cited

U.S. PATENT DOCUMENTS

| | | | |
|---|---|---|---|
| 8,682,864 B1* | 3/2014 | Plevyak | G06F 16/285 707/688 |
| 8,849,767 B1* | 9/2014 | Zheng | G06F 3/0641 707/664 |
| 9,015,316 B2 | 4/2015 | Bansal | |
| 9,268,806 B1* | 2/2016 | Kesselman | G06F 16/2255 |
| 9,547,834 B2 | 1/2017 | Nayyar | |
| 9,632,818 B2 | 4/2017 | Huang | |

(Continued)

OTHER PUBLICATIONS

Li, Jianjiang et al., "Research and Implementation of a Distributed Transaction Processing Middleware," Future Generation Computer Systems, vol. 74, Sep. 2017, pp. 232-240. Sep. 2017.

*Primary Examiner* — James Trujillo
*Assistant Examiner* — Michal Bogacki
(74) *Attorney, Agent, or Firm* — Cantor Colburn LLP; Teddi Maranzano

(57) ABSTRACT

A computer-implemented method includes receiving, at a datastore having a plurality of records of a transaction-monitoring system, a first record representing a first instance of a transaction. The datastore includes a first layer and a second layer. A first record hash code, based on the first record, is compared to a template hash code set that includes one or more template hash codes, where each template hash code corresponds to a respective transaction in a set of one or more known transactions. The first record is inserted into the first layer of the datastore. The first record is inserted into the second layer of the datastore, based at least in part on the first record hash code not being found in the template hash code set.

20 Claims, 4 Drawing Sheets

(56) References Cited

U.S. PATENT DOCUMENTS

| | | | |
|---|---|---|---|
| 10,389,596 B2* | 8/2019 | Strobel | H04L 41/142 |
| 2009/0144146 A1* | 6/2009 | Levine | G06Q 30/02 |
| | | | 705/14.69 |
| 2010/0076934 A1* | 3/2010 | Pershin | G06F 11/1451 |
| | | | 707/640 |
| 2011/0055471 A1* | 3/2011 | Thatcher | G06F 3/0608 |
| | | | 711/114 |
| 2013/0339319 A1* | 12/2013 | Woodward | G06F 3/0683 |
| | | | 707/692 |
| 2014/0143213 A1* | 5/2014 | Tal | G06F 16/1748 |
| | | | 707/692 |
| 2016/0105350 A1* | 4/2016 | Greifeneder | H04L 67/1002 |
| | | | 709/224 |
| 2016/0171039 A1* | 6/2016 | Eisenreich | G06F 16/2365 |
| | | | 707/698 |
| 2017/0078137 A1 | 3/2017 | Spiegl | |
| 2017/0308621 A1* | 10/2017 | Wu | G06F 16/9024 |
| 2018/0052907 A1 | 2/2018 | Greifeneder | |

* cited by examiner

TRANSACTION MONITORING THROUGH A DUAL-LAYER DATASTORE BASED ON A HASH FILTER

BACKGROUND

The present invention relates to transaction monitoring and, more specifically, to transaction monitoring through a dual-layer datastore based on a hash filter.

Transaction-processing systems are relevant to a wide range of industries. Such a system processes transactions across a set of nodes, which can be computing elements configured to perform processing tasks. For instance, a node can be a server. A transaction can be a message or event that needs to be passed from node to node for performance of tasks associated with the transaction, while an instance of a transaction is a specific occurrence of a transaction along with specific data relevant to that instance. The nature of the transactions and the tasks performed for processing depends on how the transaction-processing system is used. For instance, a bank might provide automated transaction processing through a transaction-processing system. In that case, the transactions could include deposits, withdrawals, and transfers. In that case, the nodes might include one or more of the following, which are useful for banking transactions: Customer Information Control System (CICS®) Transaction Server, CICS TXSeries®, Tuxedo, WebSphere Application Server (WAS), WebLogic, Jboss, a database system (e.g., DB2, Oracle®, MySQL), and a queue manager (e.g., WebSphere MQ). The nodes coordinate with one another to support transaction processing.

A transaction-processing system can handle hundreds of transactions in the span of a minute, for example. With so many processes being handled, errors can arise and may sometimes be difficult to pinpoint. In a modern information technology (IT) infrastructure, the identification and tracking of dependencies between components of end-to-end transactions are becoming more and more important for integrated fault management. Fault management is the process of detecting, isolating, and correcting malfunctions.

Monitoring systems exist for monitoring transactions and for assisting in fault management related to a transaction-processing system. Such a monitoring system monitors a plurality of transactions, each of which may be processed across a set of nodes. Each node may be, for example, a computing element configured to handle some aspect of the transactions. The monitoring system tracks transactions by identifying and collecting information about each transaction from the nodes associated with that transaction. To this end, the monitoring system includes a respective agent residing at each node. For the respective node, each agent generates at least one record describing each instance of a transaction that encounters the node during end-to-end processing of that transaction instance.

Each record includes one or more identifiers of the transaction, along with correlation data and performance data describing the transaction instance. The correlation data describes detected relationships with other transaction instances, and the performance data describes the performance of processing the transaction instance on the respective node at which the record is generated. The more specific nature and format of the correlation data and the performance data depend on the transaction-processing system, on the nature of the node, or a combination of both. The various agents transmit their generated records to a datastore, which stores the records received from the agents.

Occasionally, a user desires to see a topology of the transaction-processing system. A topology is a network of interconnections between elements. For instance, there may exist a topology among transaction instances, among nodes, among applications, or among other components. Upon request for a topology, a topology engine generates the requested topology based on the records in the datastore. Generation of the topology is generally based, at least in part, on comparing each record of a transaction to records of other transactions deemed related based on the respective correlation data.

SUMMARY

Embodiments of the present invention are directed to a computer-implemented method for generating a dual-layer datastore for monitoring transactions. A non-limiting example of the computer-implemented method includes receiving, at a datastore having a plurality of records of a transaction-monitoring system, a first record representing a first instance of a transaction. The datastore includes a first layer and a second layer. A first record hash code, based on the first record, is compared to a template hash code set that includes one or more template hash codes, where each template hash code corresponds to a respective transaction in a set of one or more known transactions. The first record is inserted into the first layer of the datastore. The first record is inserted into the second layer of the datastore, based at least in part on the first record hash code not being found in the template hash code set.

Embodiments of the present invention are directed to a system for generating a dual-layer datastore for monitoring transactions. A non-limiting example of the system includes a memory having computer-readable instructions and one or more processors for executing the computer-readable instructions. The computer-readable instructions include receiving, at a datastore having a plurality of records of a transaction-monitoring system, a first record representing a first instance of a transaction. The datastore includes a first layer and a second layer. Further according to the computer-readable instructions, a first record hash code, based on the first record, is compared to a template hash code set that includes one or more template hash codes, where each template hash code corresponds to a respective transaction in a set of one or more known transactions. The first record is inserted into the first layer of the datastore. The first record is inserted into the second layer of the datastore, based at least in part on the first record hash code not being found in the template hash code set.

Embodiments of the invention are directed to a computer-program product for generating a dual-layer datastore for monitoring transactions, the computer-program product including a computer-readable storage medium having program instructions embodied therewith. The program instructions are executable by a processor to cause the processor to perform a method. A non-limiting example of the method includes receiving, at a datastore having a plurality of records of a transaction-monitoring system, a first record representing a first instance of a transaction. The datastore includes a first layer and a second layer. Further according to the method, a first record hash code, based on the first record, is compared to a template hash code set that includes one or more template hash codes, where each template hash code corresponds to a respective transaction in a set of one or more known transactions. The first record is inserted into the first layer of the datastore. The first record is inserted into the second layer of the datastore, based at least in part on the first record hash code not being found in the template hash code set.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
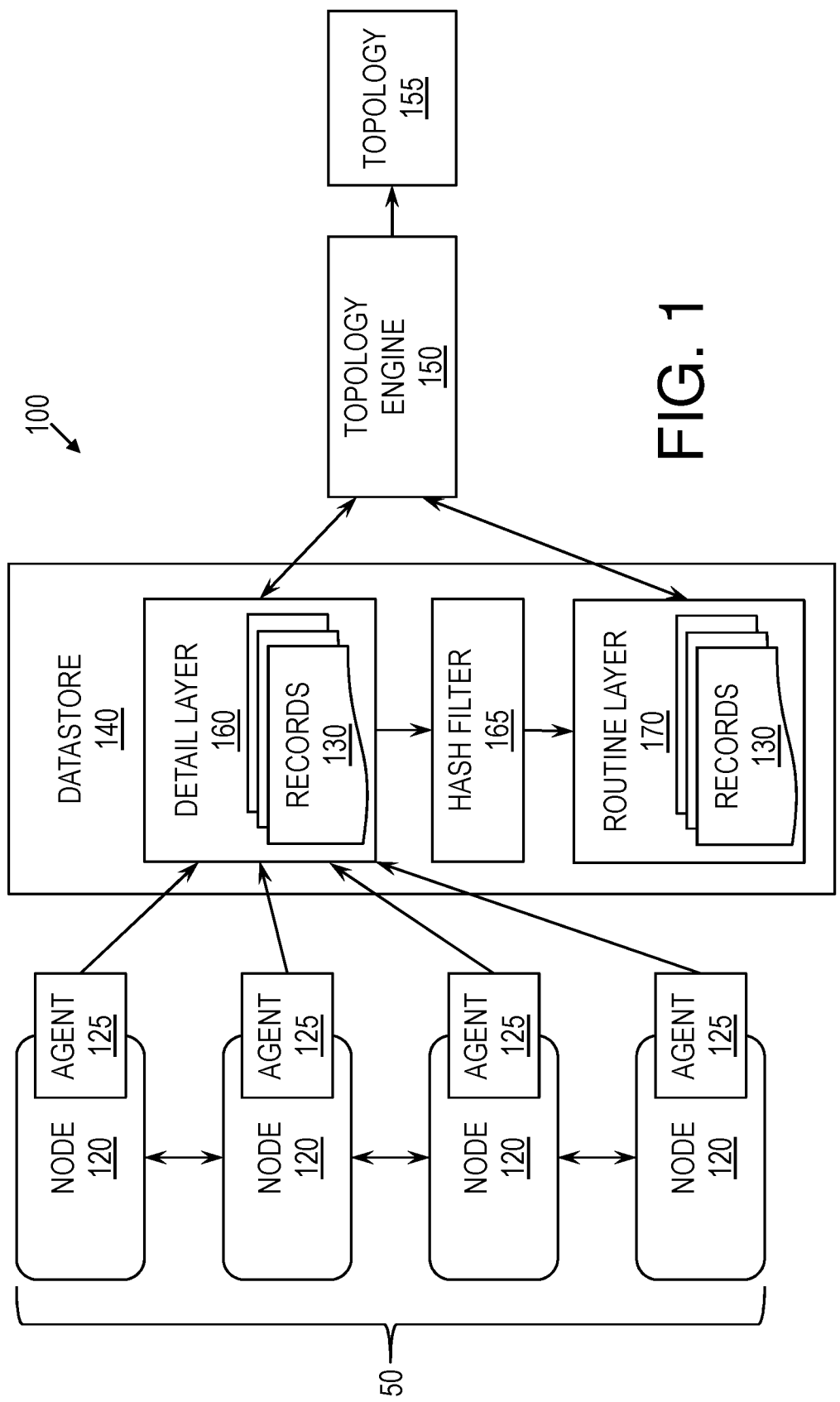
FIG. 1 is a diagram of a monitoring system for monitoring transactions, according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in the modern IT infrastructure, problem isolation can often take hours or days due to the complexity of the environment being monitored. This timing results in lost revenue and low customer satisfaction. Customers expect real-time system statuses to enable fast problem isolation. However, when the rate of transactions is high, the process of generating a topology, which is based on correlations of transactions, degrades dramatically. Thus, transaction monitoring as a whole becomes unacceptable to customers, especially when the transaction rate is high. In a real production environment, the transaction rate can be so high that occasionally topology generation can be too slow for the monitoring interval, or the entire monitoring system may crash.

Turning now to an overview of the aspects of the invention, one or more embodiments of the invention address the above-described shortcomings of the prior art by providing a mechanism for building a dual-layer datastore based on a hash filter. Each record of a transaction instance may be added to a first layer of the datastore. If the transaction survives the hash filter or is deemed to not currently exist in a second layer of the datastore, then the record may be inserted into the second layer as well. Thus, the first layer is a detail layer usable for debugging, while the second layer may be a filtered version used for more routine monitoring. A user wishing to view the datastore or the topology may select which layer to use. Generating a topology based on the second layer may take significantly less time than generating a topology based on the complete first layer. Thus, because the second layer may be used by default, the overall performance of monitoring transactions may be improved as compared to conventional monitoring systems.

The above-described aspects of the invention address the shortcomings of the prior art by improving the performance of monitoring transactions. Most of the time, the health of a transaction-processing system is good. Customers are interested only in seeing a whole picture of the transactions as well as any problems. Customers are generally unconcerned with individual healthy transactions. Embodiments of the invention retain a complete datastore from which a complete topology can be generated and used when needed. However, for more routine monitoring, embodiments of the invention additionally provide a mechanism for filtered monitoring through a second layer of the datastore, which enables generation of topologies with improved performance.

Turning now to a more detailed description of aspects of the present invention, FIG. 1 is a diagram of an improved monitoring system 100 for monitoring transactions, according to some embodiments of the invention. As shown in FIG. 1, the monitoring system 100 may include two or more nodes 120, across which a plurality of transactions are processed. Each node 120 incorporates an improved agent 125, which may run on the respective node 120 and pass information to an improved datastore 140. The datastore 140 may be a dual-layer, or dual-level, datastore 140, capable of inserting records 130 into its layers. To this end, although not shown, the datastore 140 may include, or be associated with, at least a storage component and a datastore agent. The storage component may be hardware, such as a storage device, or software, such as a database or one or more files. The datastore agent may perform tasks related to the storage component, such as inserting records 130 into the datastore 140 (i.e., into the storage component of the datastore 140).

The datastore 140 may include two layers: a detail layer 160 and a routine layer 170, also referred to respectively as a first layer 160 and a second layer 170. Generally, the detail layer 160 may include each record 130 received from the agents 125, while the routine layer 170 may include a filtered set of such records 130, based on a hash filter 165. Based on the detail layer 160 or the routine layer 170, as needed, a topology engine 150 may generate a topology 155, which may be displayed to a user, such as through a user interface.

All records 130 of the monitoring system 100 may be included in the detail layer 160 of the datastore 140. However, in contrast to a conventional monitoring system, the monitoring system 100 according to some embodiments of the invention utilizes the hash filter 165 to determine whether to insert each record 130 into the routine layer 170. Generally, the hash filter 165 may be designed to filter out records 130 deemed normal and already represented in the routine layer 170. In other words, the hash filter 165 may be designed to enable insertion of the following into the routine layer 170: (1) records 130 deemed anomalous and (2) records 130 whose respective transactions are not yet represented in the routine layer 170.

In some embodiments of the invention, the hash filter 165 utilizes a template hash code associated with each transaction. Because there are a plurality of transactions being processed and monitored, the hash filter 165 may thus utilize a plurality of template hash codes, one for each transaction. The template hash code corresponding to a transaction may be based on common features of that transaction, which together may identify the transaction. Information needed to build the template hash code of a transaction may be gathered from, for instance, a development environment in which that transaction is defined.

For example, and not by way of limitation, the common features of a transaction may include one or more of the following, which together may uniquely identify the transaction to the monitoring system 100: a server identifier, a component identifier, an application identifier, and a transaction identifier. In some embodiments of the invention, the transaction identifier alone is not enough to uniquely identify a transaction across the monitoring system 100 because, while the transaction identifier might be unique to the application issuing the transaction identifier, other applications may have other transactions sharing that transaction identifier. Thus, the combination of identifiers at various monitoring levels may together form a unique global identifier of the transaction. In addition to this global identifier, the common features may also include a normal status, or positive status, indicating the transaction is operating as intended. The value of the string or other variable used to indicate the normal status may vary across transactions, but this value may be included in the common features of the transaction. A hash code of the common features combined may be used as the template hash code for the transaction. One of skill in the art will understand how to generate a hash code based on an object, where, in this case, the object is the set of common features or a concatenation of the common features. Thus, for each transaction, a template hash code may be determined and stored for later use.

Typically, each agent 125 may generate and pass to the datastore 140 a respective record 130 of each instance of each transaction. Conventionally, the information passed is in the form of a string, in which performance data is concatenated with correlation data. In some embodiments of the invention, however, the agent 125 may include in each record 130 a hash code representing the respective transaction instance. This hash code may be further concatenated with other information in the record 130, such as the performance data and the correlation data. Thus, the record 130 may pass from the agent 125 to the datastore 140 as a string. It will be understood, however, that other mechanisms exist for passing the hash code and other data in a record 130 to the datastore 140.

The datastore 140 may divide records 130 into two layers, specifically the detail layer 160 and the routine layer 170. Each record 130 received may be automatically inserted into the detail layer 160. For example, and not by way of limitation, when the record 130 is in the form of a string, insertion may be performed by labeling the record 130 with a prefix or suffix representing the detail layer 160. For instance, a prefix or suffix of L1 may be added to a record 130 to insert the record 130 into the detail layer 160. The datastore 140 may thus maintain a set of strings, with each string forming a record 130 representing a transaction instance, and with each string indicating (e.g., by way of prefix or suffix) the layer to which the record 130 belongs.

Additionally, the datastore 140 may determine whether to insert the record 130 into the routine layer 170. This determination may be made based on the hash code in the record 130, as compared to the template hash code for the respective transaction represented by the record 130. The datastore 140 may identify the common features within the transaction, where the common features are the same as those selected for transactions when determining the template hash codes. The datastore 140 may then generate a hash code for the set of common features. Through the application of the hash filter 165, as described below, the hash code of the record 130 may be compared to the template hash code for the transaction, or to the full set of generated template hash codes for all known transactions, to determine whether to insert the record 130 into the routine layer 170.

In some embodiments of the invention, the monitoring system 100 avoids the time-consuming process of identifying the specific transaction represented by the record 130, and thus it may be unclear which previously generated template hash code corresponds to the transaction represented by the record 130. In that case, the hash code of the record 130 may be compared against each template hash code to determine whether any matching template hash code can be found. If the hash code matches a template hash code, then the record 130 may be deemed normal, or non-anomalous. As discussed above, the hash code may incorporate, by way of the common features, an indication of status. Thus, if the hash code of a record 130 does not match any template hash code, and thus does not the template hash code for the applicable transaction, this may be due to the status indicated in the record 130. If the hash code does not match a template hash code, then the record 130 may be inserted into the routine layer 170, and thereby available regardless of which layer of the datastore 140 is used to generate a topology 155. If the hash code matches a template hash code, in some embodiments of the invention, then the record 130 is inserted into the routine layer 170 only if the transaction is not yet represented in the routine layer 170. In this manner, each transaction being monitored may appear in the routine layer 170 at least once.

If it is decided to insert the record 130 into the routine layer 170, then such insertion is performed. More specifically, a copy of the record 130 may be inserted into the routine layer 170, leaving a copy of the record 130 in the detail layer 160. For example, and not by way of limitation, when the record 130 is in the form of a string, insertion may be performed by labeling a copy of the record 130, excluding the prefix or suffix indicating the detail layer 160, with a prefix or suffix representing the routine layer 170. For instance, a prefix or suffix of L2 may be added to a copy of the record 130 to insert the record 130 into the routine layer 170. The datastore 140 may thus maintain a set of strings, some of which indicate that they belong to the detail layer 160 and some of which indicate that they belong to the routine layer 170. For records 130 in the routine layer 170, both of such strings may be maintained by the datastore 140, as such records 130 may belong to both layers. Given this arrangement, displaying or utilizing only one layer or the other may be achieved by filtering strings based on their layer-indicating prefixes or suffixes, as applicable.

Figure 2:
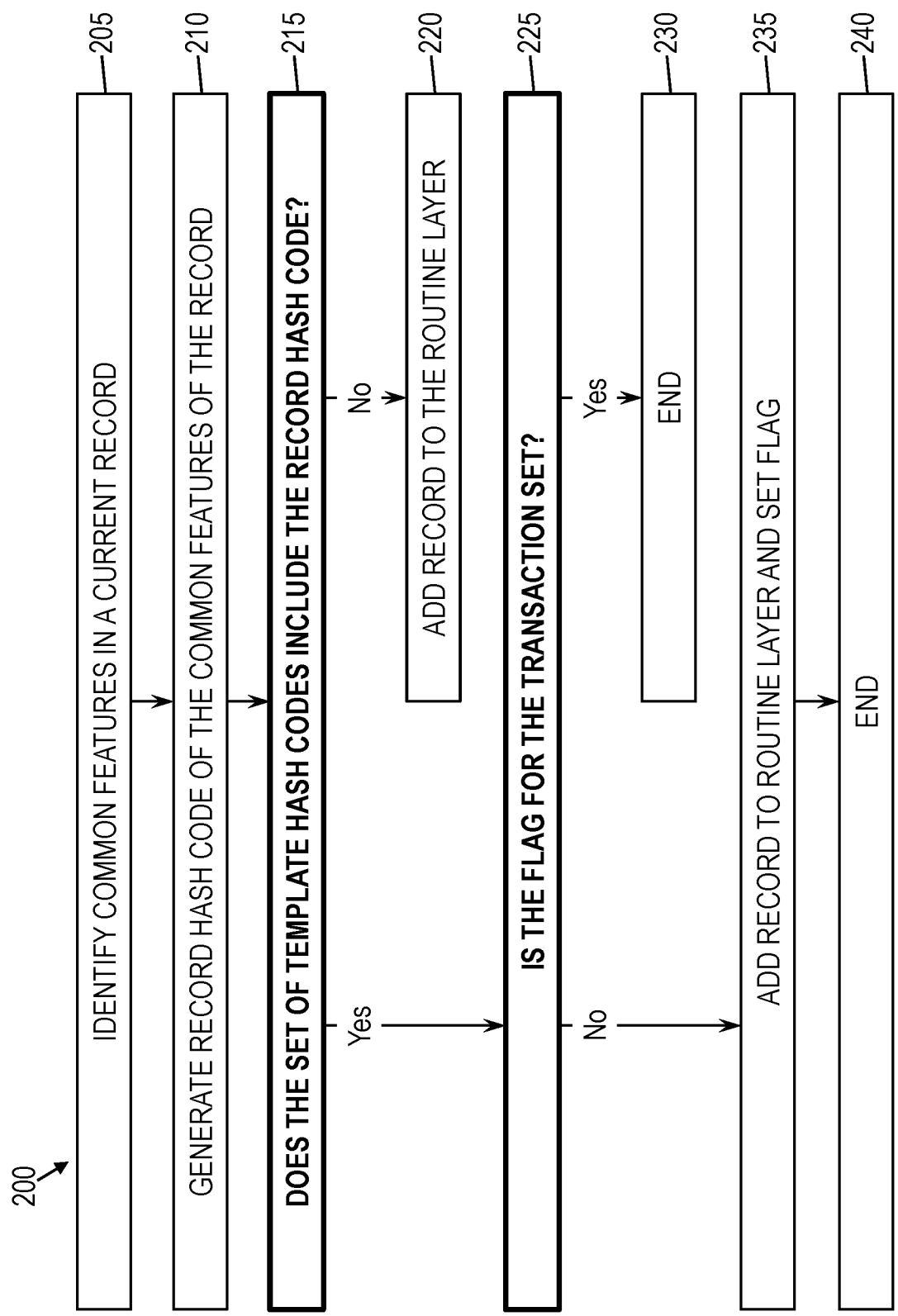
FIG. 2 is a flow diagram of a method of applying a hash filter to a record, according to some embodiments of the invention.

FIG. 2 is a flow diagram of a method 200 of applying the hash filter 165 to a record 130, according to some embodiments of the invention. Generally, the hash filter 165 may determine whether to insert the record 130 into the routine layer 170 of the datastore 140. The hash filter 165 may be implemented in various ways, such as through hardware or software, or a combination of both. For instance, a specialized hardware device used as the hash filter 165 may enable high-speed filtering, while a software module used as the hash filter 165 may be more easily updated if desired. This method 200 may be performed by the datastore 140 for each record 130 received at the datastore 140. Prior to the beginning of the method 200, the record 130 may have been received at the datastore 140 and inserted into the detail layer 160.

As shown in FIG. 2, at block 205, a value of the common features of the record 130 may be identified. At block 210, a hash code for the common features may be generated by hashing the value of the common features. At decision block 215, it may be determined whether the set of template hash codes previously generated for the various known transactions includes the hash code of the record 130.

If the hash code is found in the template hash codes, then the method 200 may skip ahead to block 225. However, if the hash code is not found in the template hash codes, then the transaction instance represented by the record 130 is deemed special, or anomalous. In that case, the method 200 may proceed to block 220, where a record 130 of the transaction is added to the routine layer 170.

For a record 130 whose hash code matches a template hash code, at decision block 225, it may be determined whether an associated flag of the transaction is set. Each transaction may be associated with a flag, which enables the hash filter 165 to determine whether the transaction is already represented by a record 130 in the routine layer 170. If the flag is set, then at block 230, the method 200 may end for the current record 130. However, if the flag is not set, then at block 235, the record 130 may be added to the routine layer 170 and the flag may be set for future reference. Then the method 200 may end for the current record 130, at block 240. In this manner, each transaction may be represented by at least one normal record 130 in the routine layer 170.

While it may be possible to filter records into the routine layer 170 without use of the hash filter 165, the hash filter 165 may speed this process. For instance, in the alternative, the common features of each record 130 may be compared to the common features for all transactions, and that comparison may be used in lieu of comparing hash codes. However, a record 130 may be multiple bytes long, and direct comparison of these common features, especially given a large number of transactions and a large number of records 130, may be prohibitively time consuming. However, an alternative to hash codes may be used. For instance, a checksum filter analogous to the hash filter 165 may be used in lieu of the hash filter 165, where the checksum filter utilizes checksums instead of hash codes.

In some embodiments of the invention, the result of application of the hash filter 165 to each record 130 entering the datastore 140 is that records 130 are divided into two layers: the detail layer 160 and the routine layer 170. The detail layer 160 may include the records 130 in the routine layer 170, as well as additional records 130 that did not survive the hash filter 165 for insertion into the routine layer 170. When a user utilizes the datastore 140, such as to generate a topology 155, the monitoring system 100 may provide access to only a single layer (i.e., the detail layer 160 or the routine layer 170) at a time to represent the datastore 140 as a whole. In some embodiments of the invention, the default layer used to represent the datastore 140 may be routine layer 170. As discussed above, the routine layer 170 is filtered of some records 130, and thus the routine layer 170 is no larger than the detail layer 160 and potentially significantly smaller. Hundreds of records 130 may be generated for each transaction within minutes. Of those, the routine layer 170 may include only one representative record 130 as well as any anomalous records 130. Thus, for example, the routine layer 170 may be hundreds of times smaller than the detail layer 160.

In some embodiments of the invention, the monitoring system 100 may operate in one of two available modes at a given time: a routine mode and a debug mode. In the routine mode, the routine layer 170 may be active and may represent the datastore 140, and in the debug mode, the detail layer 160 may be active and may thus represent the datastore 140. If a user requests a topology 155, to be generated on demand based on the datastore 140, the topology engine 150 may access the datastore 140. Specifically, the topology engine 150 may access the layer of the datastore 140 that is active in the current mode. By default, this may be the routine layer 170. Analogously, and more generally, other fault-management tools that are conventionally based on a datastore 140 may be based on the active layer of the datastore 140 described herein, according to some embodiments of the invention.

Based on the active layer, which is used as a reference, the topology engine 150 may generate a topology 155 on demand, which may be displayed to the requesting user. Generating the topology 155 may be performed through a topology-generation method known in the art, using only the active layer as a reference, rather than an entire datastore 140. The user may utilize the topology 155 as usual, such as for fault management purposes. The user may desire to switch layers. For instance, if the user sees an anomaly in the topology 155 based on the routine layer 170 and wishes to see more details in the detail layer 160, then the user may wish to view a topology 155 based on the detail layer 160. In that case, the user may instruct the topology engine 150 to switch layers, or switch modes. Upon such instruction, the topology engine 150 may generate another topology 155, this time based on the other layer. As a result, the monitoring system 100 may enable the user to view a complete topology 155 based on the detail layer 160 or a limited topology 155 based on the routine layer 170.

Figure 3:
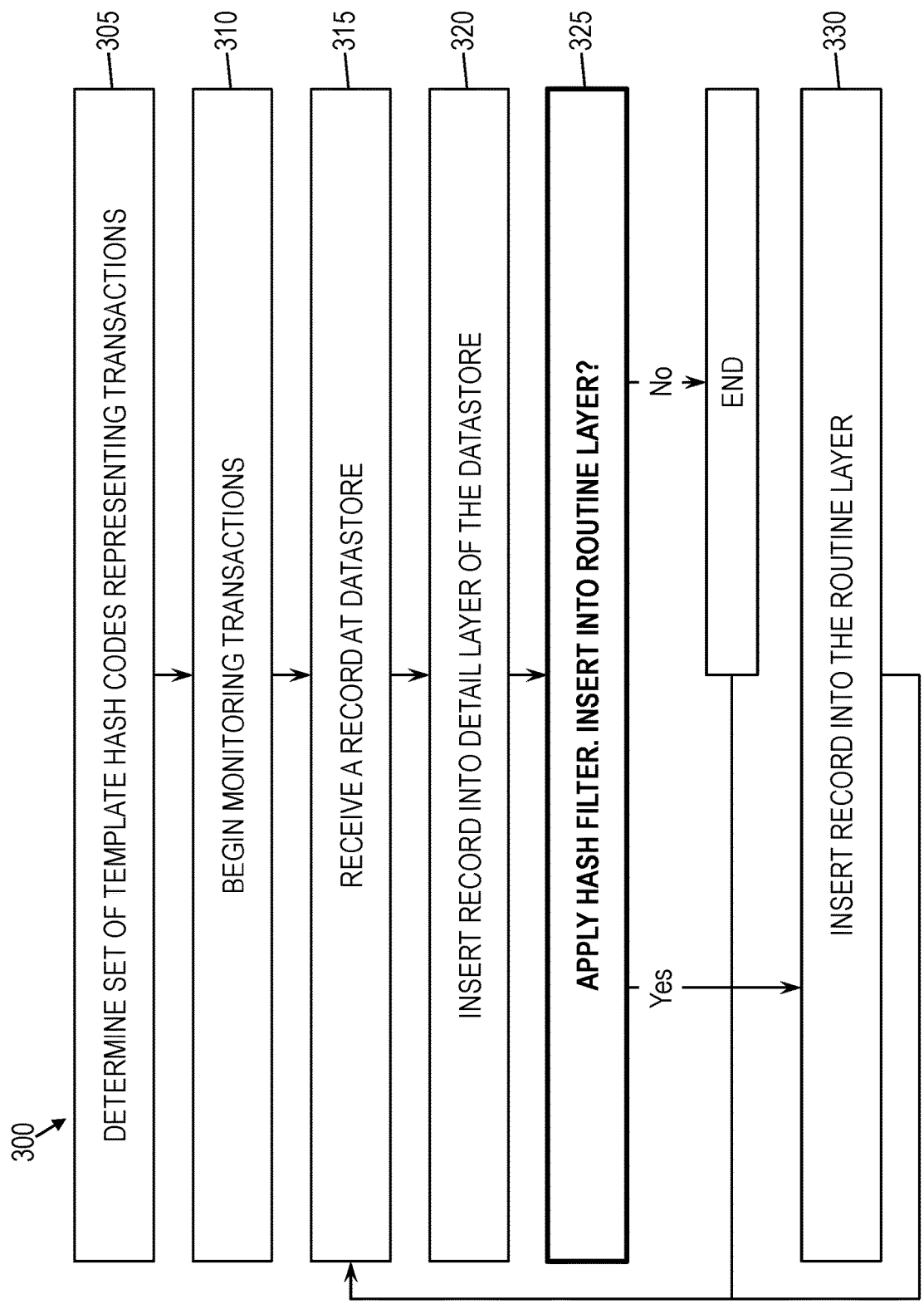
FIG. 3 is a flow diagram of a method of monitoring transactions through a dual-layer datastore based on a hash filter, according to some embodiments of the invention.

FIG. 3 is a flow diagram of a method 300 of monitoring transactions through the dual-level datastore 140 based on the hash filter 165, according to some embodiments of the invention. As shown in FIG. 3, at block 305, the monitoring system may determine a set of template hash codes representing known transactions. At block 310, the monitoring system 100 may begin monitoring transactions that are being processed through a transaction-processing system 50. In this monitoring, agents 125 may transmit to the datastore 140 records 130 describing instances of transactions.

Block 315 through block 330 may be performed for each such record 130. At block 315, a record 130 may be received at the dual-layer datastore 140, where the record 130 describes a transaction instance. At block 320, the datastore 140 may insert the record 130 into the detail layer 160 of the datastore 140. At decision block 325, the datastore 140 may apply the hash filter 165 to determine whether to insert the record 130 into the routine layer 170. If the record 130 is to be inserted into the routine layer 170, then this insertion may be performed at block 330. Otherwise, the method 300 may end for the current record 130.

Figure 4:
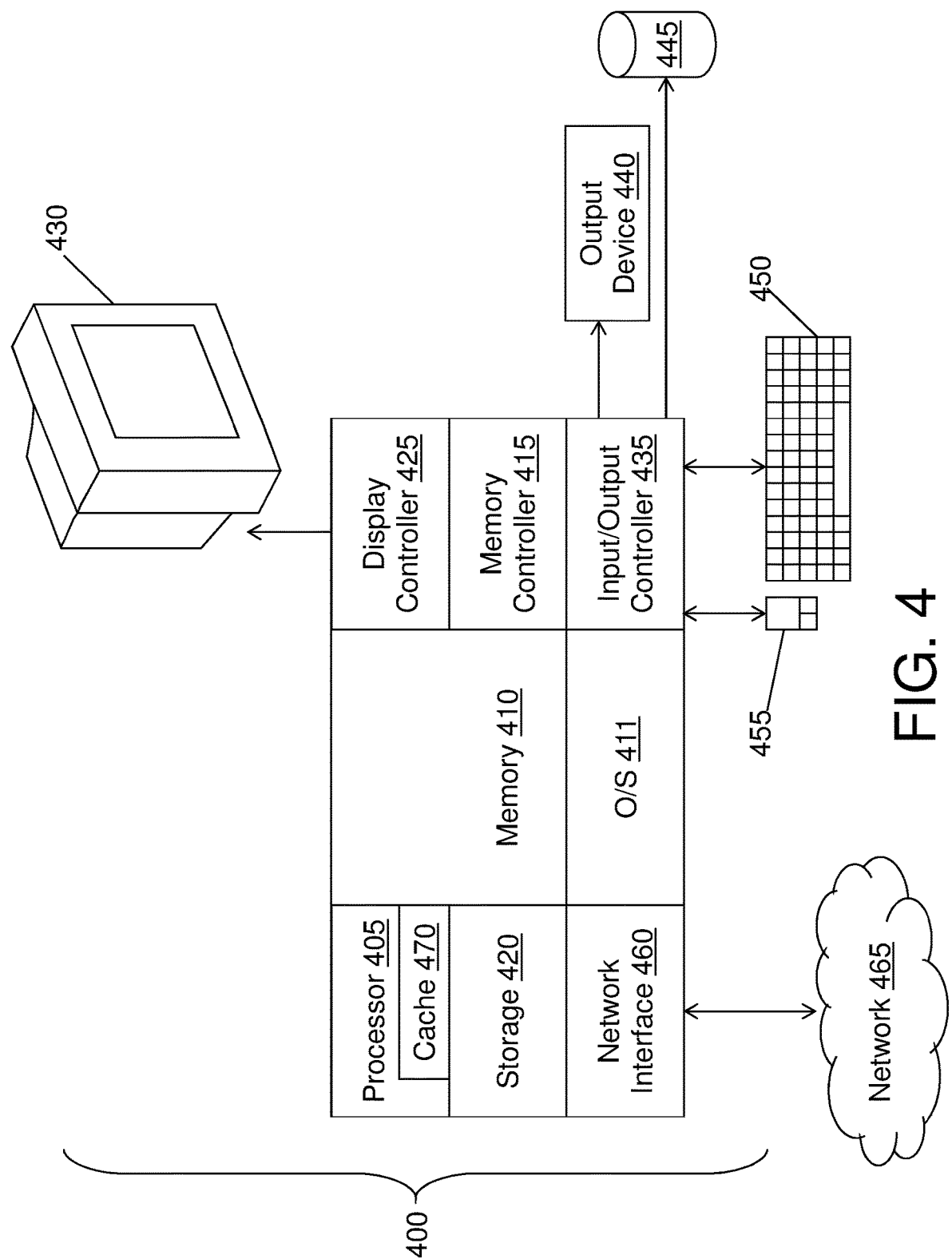
FIG. 4 is a diagram of a computer system for implementing some or all aspects of the monitoring system, according to some embodiments of this invention.

FIG. 4 is a diagram of a computer system 400 for implementing some or all aspects of the monitoring system 100, according to some embodiments of this invention. The monitoring systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For example, and not by way of limitation, each of the nodes 120, the agents 125, the datastore 140, the hash filter 165, and the topology engine 150 may be implemented as one or more computer systems 400 or components on computer systems 400.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor-based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid-state drive. The stored instructions in memory 410 or in storage 420 may include those enabling the processor to execute one or more aspects of the monitoring systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Monitoring systems 100 and methods according to this disclosure may be embodied, in whole or in part, in computer program products or in computer systems 400, such as that illustrated in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, at a datastore comprising a plurality of records of a transaction-monitoring system, a first record representing a first instance of a transaction;
   wherein the datastore comprises a first layer and a second layer;
   comparing a first record hash code, based on the first record, to a template hash code set comprising one or more template hash codes, wherein each template hash code corresponds to a respective transaction in a set of one or more known transactions;
   inserting the first record into the first layer of the datastore; and
   inserting the first record into the second layer of the datastore, based at least in part on the first record hash code not being found in the template hash code set,
   wherein the second layer comprises at least a subset of the records in the first layer.

2. The computer-implemented method of claim 1, further comprising:
   receiving, at the datastore, a second record representing a second instance of the transaction;
   comparing a second record hash code, based on the second record, to the template hash code set;
   inserting the second record into the first layer of the datastore; and
   opting not to insert the second record into the second layer of the datastore, based at least in part on the second record hash code being found in the template hash code set.

3. The computer-implemented method of claim 1, further comprising generating a template hash code corresponding to the transaction, wherein the template hash code is based on one or more features deemed common to each instance of the transaction in combination with a normal status.

4. The computer-implemented method of claim 3, wherein the first record hash code is generated based on the one or more features deemed common to each instance of the transaction in combination with a status of the first record.

5. The computer-implemented method of claim 1, further comprising:
   selecting, as an active layer, one of the first layer and the second layer of the datastore;
   receiving a request for a first topology; and
   generating the first topology based on the active layer.

6. The computer-implemented method of claim 5, wherein the active layer is the second layer, and wherein the first topology excludes one or more records included in the first layer.

7. The computer-implemented method of claim 6, further comprising:
   receiving an instruction to switch the active layer;
   activating the first layer, responsive to the instruction; and
   generating a second topology based on the first layer, responsive to the instruction.

8. A system comprising:
   a memory having computer-readable instructions; and
   one or more processors for executing the computer-readable instructions, the computer-readable instructions comprising:
     receiving, at a datastore comprising a plurality of records of a transaction-monitoring system, a first record representing a first instance of a transaction;
     wherein the datastore comprises a first layer and a second layer;
     comparing a first record hash code, based on the first record, to a template hash code set comprising one or more template hash codes, wherein each template hash code corresponds to a respective transaction in a set of one or more known transactions;
     inserting the first record into the first layer of the datastore; and
     inserting the first record into the second layer of the datastore, based at least in part on the first record hash code not being found in the template hash code set, wherein the second layer comprises at least a subset of the records in the first layer.

9. The system of claim 8, the computer-readable instructions further comprising:
   receiving, at the datastore, a second record representing a second instance of the transaction;
   comparing a second record hash code, based on the second record, to the template hash code set;
   inserting the second record into the first layer of the datastore; and
   opting not to insert the second record into the second layer of the datastore, based at least in part on the second record hash code being found in the template hash code set.

10. The system of claim 8, the computer-readable instructions further comprising generating a template hash code corresponding to the transaction, wherein the template hash code is based on one or more features deemed common to each instance of the transaction in combination with a normal status.

11. The system of claim 10, wherein the first record hash code is generated based on the one or more features deemed common to each instance of the transaction in combination with a status of the first record.

12. The system of claim 8, the computer-readable instructions further comprising:
   selecting, as an active layer, one of the first layer and the second layer of the datastore;

receiving a request for a first topology; and generating the first topology based on the active layer.

13. The system of claim 12, wherein the active layer is the second layer, and wherein the first topology excludes one or more records included in the first layer.

14. The system of claim 13, the computer-readable instructions further comprising:

receiving an instruction to switch the active layer;

activating the first layer, responsive to the instruction; and generating a second topology based on the first layer, responsive to the instruction.

15. A computer-program product for generating a dual-layer datastore for monitoring transactions, the computer-program product comprising a computer-readable storage medium having program instructions embodied therewith, the program instructions executable by a processor to cause the processor to perform a method comprising:

receiving, at a datastore comprising a plurality of records of a transaction-monitoring system, a first record representing a first instance of a transaction;

wherein the datastore comprises a first layer and a second layer;

comparing a first record hash code, based on the first record, to a template hash code set comprising one or more template hash codes, wherein each template hash code corresponds to a respective transaction in a set of one or more known transactions;

inserting the first record into the first layer of the datastore; and inserting the first record into the second layer of the datastore, based at least in part on the first record hash code not being found in the template hash code set, wherein the second layer comprises at least a subset of the records in the first layer.

16. The computer-program product of claim 15, the method further comprising:

receiving, at the datastore, a second record representing a second instance of the transaction;

comparing a second record hash code, based on the second record, to the template hash code set;

inserting the second record into the first layer of the datastore; and opting not to insert the second record into the second layer of the datastore, based at least in part on the second record hash code being found in the template hash code set.

17. The computer-program product of claim 15, the method further comprising generating a template hash code corresponding to the transaction, wherein the template hash code is based on one or more features deemed common to each instance of the transaction in combination with a normal status.

18. The computer-program product of claim 17, wherein the first record hash code is generated based on the one or more features deemed common to each instance of the transaction in combination with a status of the first record.

19. The computer-program product of claim 15, the method further comprising:

selecting, as an active layer, one of the first layer and the second layer of the datastore;

receiving a request for a first topology; and generating the first topology based on the active layer.

20. The computer-program product of claim 19, wherein the active layer is the second layer, and wherein the first topology excludes one or more records included in the first layer.

* * * * *